United States Patent [19]
Fout

[11] Patent Number: 4,753,472
[45] Date of Patent: Jun. 28, 1988

[54] BAKER'S PEEL

[76] Inventor: Richard A. Fout, 5156 River Rd., Radnor, Ohio 43066

[21] Appl. No.: 23,566

[22] Filed: Mar. 9, 1987

[51] Int. Cl.$^4$ ............................................. A47J 43/28
[52] U.S. Cl. ......................................... 294/32; 294/8; 294/29
[58] Field of Search ............ 294/32, 6, 7, 8, 15, 294/55, 19.1, 28, 29, 31.1, 26.5, 99.2, 50.9, 59

[56] References Cited

U.S. PATENT DOCUMENTS

| | | | |
|---|---|---|---|
| 587,701 | 8/1897 | Carlson | 294/29 |
| 2,333,564 | 11/1943 | Hargrave | 294/29 |
| 3,761,120 | 9/1973 | Binkert | 294/8 |

*Primary Examiner*—James B. Marbert
*Attorney, Agent, or Firm*—Richard C. Litman

[57] ABSTRACT

This invention relates to an improvement on the conventional baker's peel. The device is equipped with an elongated handle and lever actuated clamping means which enables the user to remove a hot baking pan from an oven while the baked goods thereon can remain in the oven for browning. The peel also functions in a conventional manner to enable the removal of the hot baked goods from the oven after sufficient browning.

7 Claims, 1 Drawing Sheet

BAKER'S PEEL

BACKGROUND OF INVENTION

Field of Invention

The invention relates to a culinary device, and more particularly, an improved baker's peel for the handling of baking pans, cookie sheets, and the like, and hot baked foods cooked thereon, especially in the handling of pizzas.

The invention further relates to an improved baker's peel which provides efficient safe means for the removal of hot baking pans from ovens. More particularly, the invention is directed to providing means for the removal of hot pizza pans while allowing the pizza to remain in an oven for browning purposes. The device is also used to remove the cooked pizza once it has browned. It prevents the user from suffering burns or other heat related injuries commonly associated with this cooking procedure. The invention is particularly suited for use in high production pizza manufacturing establishments.

The invention can be used for a variety of products that are baked in hot ovens on baking pans, cookie sheets, and the like, and the method of construction of the device is more fully described herein.

Description of the Prior Art

Various prior art culinary devices and baker's peels, and the like, as well as their apparatuses and method of their construction in general, are found to be known and exemplary of the U.S. prior art. They are the following:

| Name of Inventor | U.S. Pat. No. |
| --- | --- |
| J. H. Collins | 856,446 |
| J. G. Ludwig | 1,135,906 |
| Poole et al. | 2,217,319 |
| J. B. Thomas | 2,643,907 |
| J. W. McDevitt | 2,688,290 |

Ludwig discloses an improvement on a baker's peel consisting of a peel with a movable element which pushes food off the peel into the oven. Collins is directed toward a cooking utensil for soft food where it would be difficult to use a conventional fork or knife. Poole and Folsom show a device to lift roasts, cakes or pies from a baking pan. Thomas discloses a cooking utensil which combines a cooking fork and spatula. The McDevitt patent discloses a baker's peel which has as its principal function the cooling of food resting thereon.

These patents or known prior uses teach and disclose various types of baker's peels and culinary devices of various sorts and manufactures, and the like, as well as methods of their construction, but none of them, whether taken singly or in combination, disclose the specific details of the combination of the invention in such a way as to bear upon the claims of the present invention.

SUMMARY OF THE INVENTION

An object, advantage and feature of the invention is to provide a novel baker's peel that is safe and efficient in use, and lends itself to the handling of baking pans, cookie sheets, and the like, and hot baked foods thereon.

Another object of the invention is directed further to the device providing for the easy removal of hot baking pans from ovens while leaving the baked foods in the oven to brown. This is a substantial improvement over existing practices whereby the baker utilizes various make-shift devices to remove the pan, oftentimes ruining the baked food or burning him or herself in the process.

Also an object of the invention is to provide a novel and improved construction of a baker's peel which has an elongated handle, preferably of thermal insulating material, which prevents the user from sustaining heat related injuries.

Another object of the invention is to provide a novel and improved method of construction of a baker's peel whereby a clamping means is incorporated therein, allowing for the removal of baking pans, baked foods or the like. The novel clamping means is activated by a v-shaped actuator rod which is engaged by compressing a lever near the proximate end of the handle.

These, together with other objects and advantages which will become subsequently apparent, reside in the details of the process and the operation thereof as is more fully hereinafter described and claimed. References are made to drawings forming a part hereof, wherein like numeral referred to like parts throughout.

DESCRIPTION OF THE PREFERRED EMBODIMENT(S) OF THE INVENTION

Figure 1:
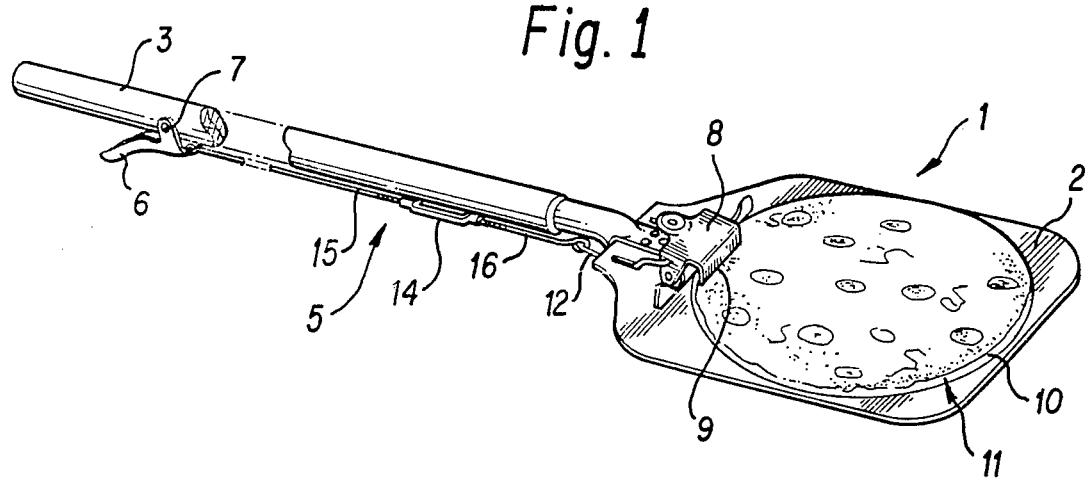
FIG. 1 is a perspective view of the baker's peel embodying the concepts of the invention.

Referring now to the drawings there is shown in FIG. 1 a perspective view of an improved baker's peel 1 consisting of a plate 2, made of a thin metallic substance or other heat resistant rigid material. At the end of said plate 2 is attached a handle 3 by attachment screws 4 or other similar securing means.

Figure 2:
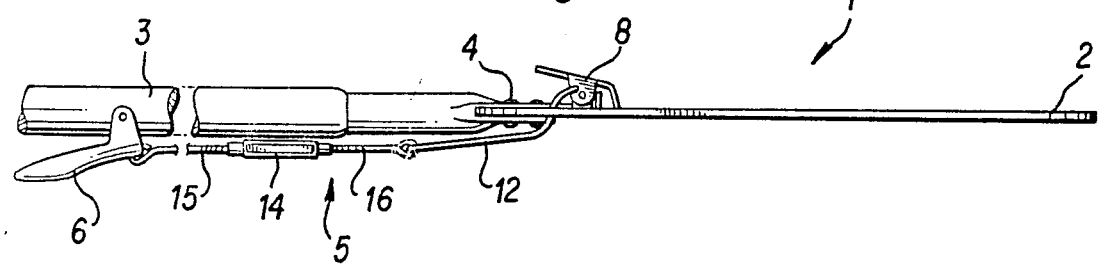
FIG. 2 is a side view of the baker's peel according to a preferred embodiment and best mode of the present invention.

FIG. 1 as well as FIG. 2, a side view of the invention, shows actuating lever 6 which is secured to handle 3 by securing pin 7 or similar means. The handle 3 is of sufficient length to enable the user to maintain a safe distance from the oven.

Main actuator rod 5 is composed of three sections, rod 15 and rod 16, joined by adjustable turnbuckle 14. Rod 15 has a looped eyelet on one end which passes through a hole in lever 6 for securing lever 6 to main actuator rod 5. On the other end of rod 15 is a threaded section which is engaged to a corresponding threaded section on adjustable turnbuckle 14. The other end of turnbuckle 14 also is threaded for a like engagement with one end of rod 16. The other end of rod 16 has a looped eyelet by which rod 16 is connected to the acute bend of v-shaped actuator rod 12, which is an acute-angled wire segment. Two arms 17, 18 extend from the acute bend of v-shaped actuator rod 12. The plate 2 has two holes therethrough for passage of the arms 17, 18 from the lower surface to the upper surface. The main activator rod 5 provides stability to clip 8 in that the two arms balance the peel 1 through the laterally spaced holes in the peel. At the point where the arms 17, 18 of rod 12 pass through the holes in the plate 2 they bend upwardly and inwardly to become parallel. The ends of the arms 17, 18 bend inwardly again 90 degrees where they are attached to clip 8 by mean of insertion through holes in the side of said clip, or similar securing means.

Turnbuckle 14 is adjustable so that clip 8 can conform to various sizes of baking pans. This is accomplished by turning turnbuckle 14, actuating rod 5 contracts or expands in length, affecting the height of the edge 13 of clip 8.

By compressing actuating lever 6, main activator rod 5 moves rearward, thereby causing v-shaped activator rod 12 also to move rearward, thereby causing clip 8, attached to the upper surface of plate 2, to open. Clip 8, as shown in the drawings, is illustrative of the type of spring loaded clip means used in the invention. Clip 8, more particularly clip edge 9 thereof, is now ready to be secured to rim 10 of baking pan 11. By depressing actuating lever 6, clip edge 9 is firmly secured to rim 10 of baking pan 11, enabling the user to remove baking pan 11 while allowing a hot baked food, such as pizza, to remain in the oven for browning.

Figure 3:
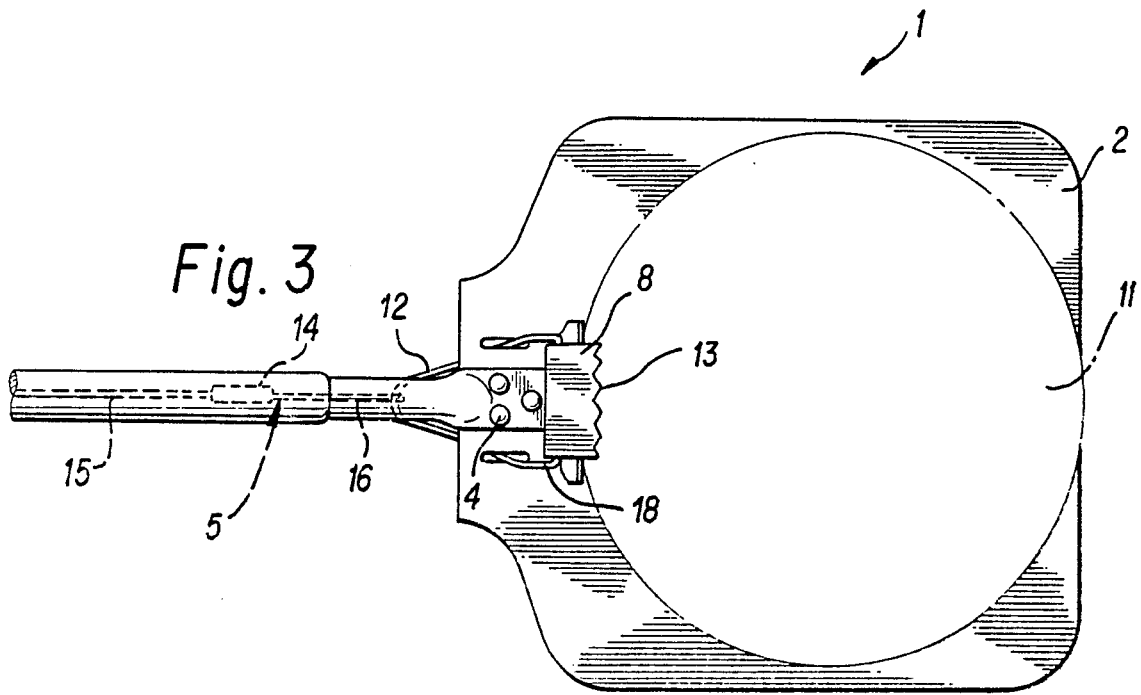
FIG. 3 is a top view of the baker's peel according to a preferred embodiment and best mode of the present invention.

FIG. 3 shows the preferred embodiment and best mode of the present invention; the clip edge 9 is serrated, for better gripping means, as identified by serrated clip edge 13 in FIG. 3.

In operation, the user of the device would place baking pan 11 or a cookie sheet, or like article, containing the goods to be baked on the peel 1. The user then applies a squeezing action to the actuating lever 6, which raises clip 8 in the manner described above. The user then places the pan 11 under clip 8 in such a manner so that when actuating level 6 is released, thereby lowering clip 8, the rim 10 is clasped to plate 2 by clip 8, edge 9. The user then inserts the peel 1, into the oven and either slides the baked goods off the pan 11 onto the oven surface or rack, or if the clamping means of the invention are used, then, once the pan is in the oven, releases said clip 8, and then slides the pan 11 onto the oven surface or rack. By using the invention in this manner, problems associated with baking pans accidently sliding off the peel are avoided. However, the user may also operate the invention without resorting to the use of the clip.

After sufficient cooking time, the peel 1 is then used to remove the baking pan 11 from the oven. The plate 2 of the peel 1 is inserted under the baking pan 11. The user then compresses the actuating lever 6 and clasps the rim 10 to the plate 2 as described above. The user then tilts the device in such a manner by manuevering the handle 3, so that the baked goods slide off the pan 2 onto the oven surface or rack for browning. The device is then removed from the oven until a suitable time has passed for the baked goods to brown.

The peel 1 is then inserted into the oven for removal of the sufficiently browned baked goods. The peel 1 can be used in its conventional manner for this step, or, if desired, the clipping means can be used to secure the food for removal.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, which fall within the scope of the invention.

What is claimed is:

1. A baker's peel for the handling of baking pans, cookie sheets, or like articles, in ovens comprising:
   a thin plate of rigid heat resistant material for holding baking pans, cookie sheets, or like articles;
   a handle attached to an end of said plate;
   a spring loaded clip means attached to the upper surface of said plate adjacent to the handle, for securing baking pans or cookie sheets to said plate;
   an actuating rod extending through said plate for operating said clip;
   said actuating rod having two rods, a turnbuckle, and a v-shaped actuator rod;
   said actuating rod extending along the handle to the proximate end of said handle;
   an actuating lever secured to said handle for movement of the actuating rod so that operation of the actuating lever opens the clip for gripping baking pans or cookie sheets on the plate.

2. The apparatus of claim 1, wherein the turnbuckle can be adjusted so that the clipping means can conform to baking pans of varying sizes.

3. The apparatus of claim 1, wherein the handle is of insulating material.

4. The apparatus of claim 1, wherein the handle is of sufficient length to enable the user to maintain a safe distance from the oven.

5. The apparatus of claim 1, wherein the rigid heat resistant material of said plate is a metallic substance.

6. The apparatus of claim 1, wherein said plate has laterally spaced holes therethrough for the passage of said actuating rod from the lower surface to the upper surface.

7. The apparatus of claim 1, wherein the clip means has serrated edges.

* * * * *